W. B. RICHARDS.
ILLUMINATED TRAFFIC BUTTON.
APPLICATION FILED SEPT. 4, 1917.
1,265,386.
Patented May 7, 1918.
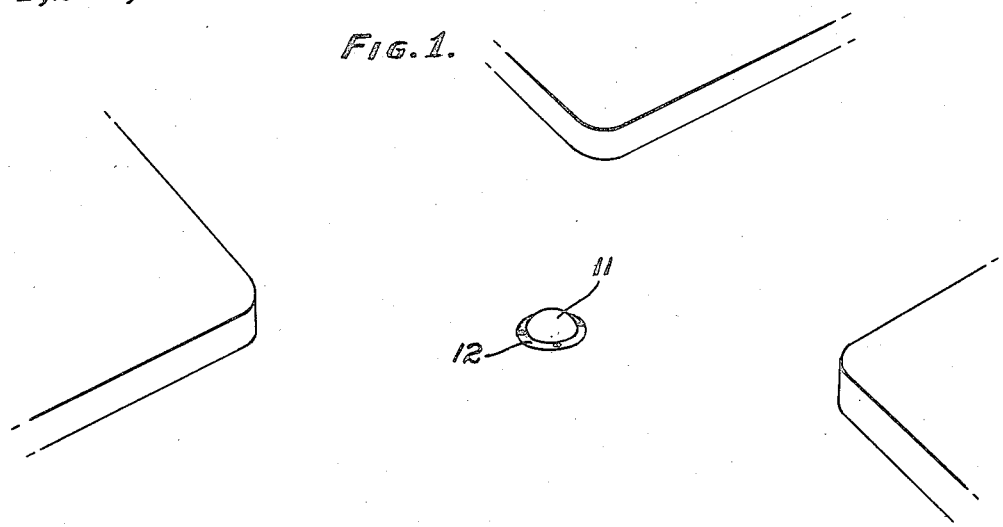
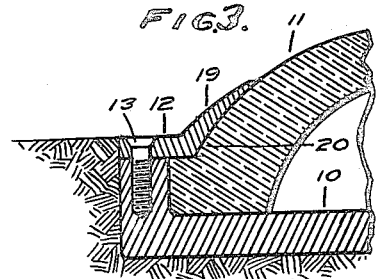
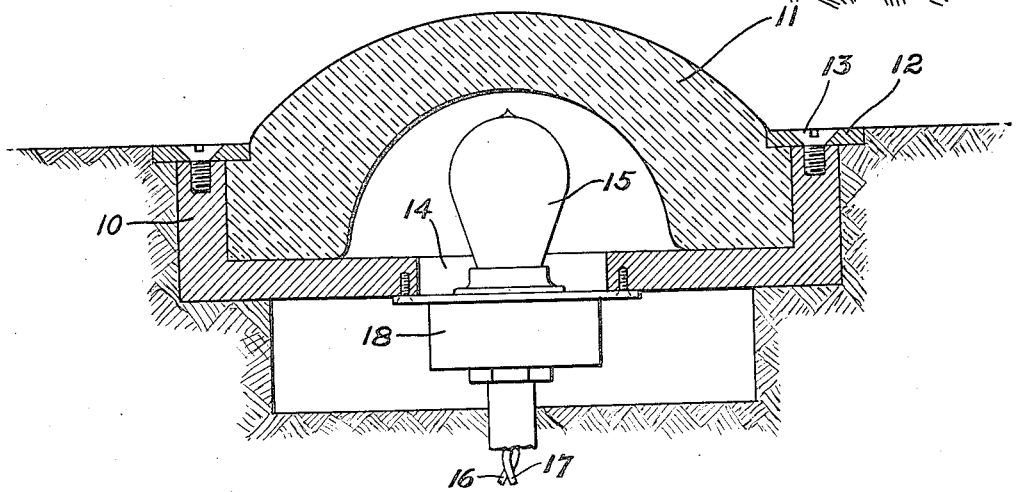
INVENTOR
WILLIAM B. RICHARDS
BY Hazard & Miller
ATT'YS.

UNITED STATES PATENT OFFICE.

WILLIAM B. RICHARDS, OF POMONA, CALIFORNIA.

ILLUMINATED TRAFFIC-BUTTON.

1,265,386.  Specification of Letters Patent.  Patented May 7, 1918.

Application filed September 4, 1917. Serial No. 189,633.

*To all whom it may concern:*

Be it known that I, WILLIAM B. RICHARDS, a citizen of the United States, residing at Pomona, in the county of Los Angeles and State of California, have invented new and useful Improvements in Illuminated Traffic-Buttons, of which the following is a specification.

This invention relates to a signaling device and particularly pertains to a traffic indicator.

The principal object of this invention is to provide an indicating member adapted to be mounted within the pavement at street intersections to indicate the center of the intersecting streets and direct the movement of vehicles therearound, said indicator being illuminated.

Other objects will appear hereinafter.

The invention is illustrated, by way of example, in the accompanying drawings in which:

Figure 1 is a view in perspective illustrating a street intersection and particularly disclosing the traffic indicator applied thereto.

Fig. 2 is a view in transverse section through the indicator more particularly disclosing its construction and the manner in which it is mounted in the pavement.

Fig. 3 is a fragmentary view in section illustrating the device as fitted with another form of clamping ring and bumper.

Referring more particularly to the drawings, 10 indicates a metal base box, preferably circular in plan. This box is adapted to be embedded beneath the surface level of the pavement to receive a hemispherical bumper 11. The bumper 11 extends above the surface of the pavement and is preferably made of glass, or other translucent material. A flange is formed around the outer periphery of the bumper to receive a clamping ring 12 which is held upon the top of the box by screws 13. An opening 14 is formed through the floor of the box and in the center thereof. This opening accommodates an incandescent lamp 15 which is illuminated by electric current passing through conduits 16 and 17 and to the junction box 18, upon which the lamp is mounted.

Reference being had to Fig. 3, it will be seen that another form of clamping ring is used. In this case the main portion of the ring is the same as that shown in Fig. 2. However, an up-turned flange 19 is cast integral with the inner periphery of the ring and has a tapered outer face arcuate in shape to form a continuation of the outer surface of the indicating bumper 11. It will be understood that a shoulder 20 is formed around the bumper and provides a seat for the overlapping extension of the flange so that the ring will be more firmly held in place and its edge protected from severe shock.

In the use of the device, the box 10 is embedded within the street and is supplied with the incandescent lamp which is suitably wired and in connection with a source of electrical supply. The lamp is then covered by the indicating bumper 11. When the clamping ring 12 is secured in place, the device is ready for use. In the daytime the bumper may be readily seen, while at night the lamp 15 is illuminated. In this manner the center of the street intersections may be constantly indicated and traffic regulated thereby.

It will thus be seen that the device here disclosed is simple in its construction, may be easily mounted in position and will act effectively to produce the desired results.

While I have shown the preferred form of my illuminated traffic button as now known to me, it is evident that various changes in the combination, construction and arrangement of parts may be made by those skilled in the art without departing from the spirit of the invention as claimed.

I claim:

1. A traffic indicator consisting of a circular box comprising a flat bottom and an annular flange; there being an opening at the center of the bottom; a hemispherical hollow glass bumper fitting within the flange and resting upon the bottom, a clamping ring overlapping the bumper at the top of the flange and secured to the flange by screws, a lamp socket secured to the lower face of the bottom and centrally located in the opening, and a lamp in the lamp socket extending upwardly into the hollow of the bumper.

2. A traffic indicator consisting of a circular metal bottom having a central opening, a flange extending upwardly around the edge of the bottom, a hemispherical hollow glass bumper mounted within the flange upon the bottom and having a retaining flange on a level with the upper edge of the metal flange, a clamping ring mounted upon the upper edge of the metal flange and engaging the flange of the bumper, screws holding the clamping ring in place, a flange formed integral with the clamping ring and extending upwardly and fitting around the bumper to protect the bumper, and a lamp mounted in the central opening of the bottom and extending upwardly into the hollow of the bumper.

In testimony whereof I have signed my name to this specification.

WILLIAM B. RICHARDS.